Patented Mar. 1, 1938

2,110,070

UNITED STATES PATENT OFFICE 2,110,070

COATED FABRICS

Russell Morgan, Drexel Hill, Pa., assignor to E. I. du Pont de Nemours & Company, Wilmington, Del., a corporation of Delaware No Drawing. Application April 16, 1936, Serial No. 74,783

3 Claims. (Cl. 91—68)

This invention relates to rubber coated base material with a colored enamel finish for automobile tops and the like, and more particularly to automobile top material of improved appearance and durability.

Rubber coated automobile top materials are made by applying a film of rubber to a fabric base and then finishing the rubberized fabric usually with a black oil type varnish to protect the rubber film from deteriorating influences of sunlight and other weather conditions. Periodic attempts have been made to use colored varnishes in place of the black varnish to produce a more attractive material so far as color is concerned and one for which there has been a demand by the trade but thus far the black varnishes, and particularly those in which asphalt is a major constituent, have been the only ones which produce a material having satisfactory resistance to deterioration in service. The colored varnishes which have been used have been either very limited as to the colors produced, or, as indicated above, the durability has been so poor that satisfactory products have not been produced. As a consequence, the only real satisfactory automobile top material has been black although there has been a definite demand by the trade for material in other colors such as to harmonize with the color of the automobile body itself.

This invention has as an object the provision of new and improved rubber composition coated fabric. A further object is the provision of flexible rubber composition coated fabrics possessing improved durability and finished in bright colors. Other objects will appear hereinafter.

These objects are accomplished by applying a film of a specific type of rubber composition compound to a fibrous base material and then applying a surface film to the rubber film of a pigmented fatty oil or fatty oil acid modified polyhydric alcohol-polybasic acid resin enamel of a special type.

For the base material for my improved coated product I preferably combine two fabrics, one a sheeting and the other having a twill weave, by means of a suitable rubber cement according to procedures well known to those skilled in the art of preparing such combined fabrics. To the sheeting side of the combined fabrics is then applied a film of a rubber composition possessing special characteristics and comprising essentially rubber, wax, pigment, filler and vulcanizing ingredients. I have found that by the use of this kind of undercoat in combination with a top coat of pigmented oil modified polyhydric alcohol-polybasic acid resin it is possible to produce a colored automobile top material that in durability is equal to or superior to the conventional black finishes. The following is an example of an undercoat suitable for the present purpose:

| | Parts by weight |
|---|---|
| Raw rubber | 31.00 |
| Montan wax | 10.20 |
| Carbon black | 6.80 |
| Clay | 44.20 |
| Stearic acid | .49 |
| Litharge | 6.80 |
| Sulfur | .51 |
| | 100.00 |

A film of the above composition, which is relatively stiff and which has low elongation, is applied to the base material by any suitable means, and preferably by a rubber calender in the manner well known to the rubber industry.

After the film has been applied to the combined fabrics a composition of the following formula is applied:

| | Parts by weight |
|---|---|
| Shellac | 75 |
| Soap chips | 5 |
| Ammonium hydroxide (28% NH₃) | 15 |
| Dye | 2 |
| Water | 600 |

This composition, a water type varnish for drying the rubber film, is applied by any suitable means, that is, by flowing, doctor knife, etc. After the application of the varnish the volatile material is removed by passing the coated fabric through a heated chamber or over heated coils and the resulting material may then be subjected to an embossing operation to produce a definite design or may be left in a smooth condition, the choice depending upon the character desired in the finished material. Subsequent to the drying of the varnish, or in case of embossed material after the embossing operation, the pigmented fatty oil or fatty oil acid modified polyhydric alcohol-polybasic acid resin enamel is applied to the rubber film. I prefer to use an enamel of approximately the following formula:

| | Parts by weight |
|---|---|
| Pigment | 24 |
| Oil modified polyhydric alcohol - polybasic acid resin varnish | 72 |
| Low - flash naphtha (boiling range 125–170° C.) | 4 |
| | 100 |

The varnish in the above enamel consists of 31 parts by weight of low-flash naphtha (125–170° C.) and 79 parts of soya bean oil modified glyceryl phthalate resin containing in chemical combination equal parts of the oil and glyceryl phthalate.

After the pigmented enamel has been applied to the rubber film on the fabric the material is baked at a temperature of approximately 250° F. for about 2½ hours to effect vulcanization of the rubber and to thoroughly dry and set the enamel. After this heat treatment the material is suitably cooled and wound into rolls after which it is ready for use.

The rubber content of the composition should not be substantially less than 25% or greater than 35% by weight of the ingredients present. The rubber compound used in the present invention must be one giving a film of low elasticity, high permanent set, low co-efficient of thermal expansion and high impermeability to moisture. Vulcanizing agents other than the stearic acid, litharge, and sulfur mixture of the example may be used.

The percentage of the carbon black pigment and clay filler can be varied as to yield a compound having the desired low elasticity and high permanent set. Similarly, fillers of the reinforcing type other than clay may be used. The production of such compounds will be understood by those skilled in the art. While Montan wax is preferred, other high melting point waxes and resins, such as shellac, may be used and may vary in amount in the composition between 5% and 20%.

Although I prefer to use a two-ply fabric as the base material, I may use more or less satisfactorily single-ply fabrics as well as other combinations of fabrics such as sheeting combined to sheeting, sheeting combined to drill, whipcord, or other types of heavier fabric satisfactorily serve the purpose, the principal requirements being tensile strength and bulk characteristics in the finished product. Non-woven bases of the felted type are also suitable.

The amount of rubber film to be applied to the fabric either single or plied may vary within wide limits, the limitations being set chiefly by the demands of economy and flexibility and weight of the finished product.

The vulcanization time is subject to variation, depending largely on the specific activator or combination of such used to effect the vulcanization of the compound.

While in the example of a preferred embodiment of the invention so-called water varnish is noted for application to the rubber film to dry it, other types of varnishes or dusting agents may be used with equal satisfaction.

The oil modified resins used in the present invention contain the acid radicals of fatty oil acid and may be made by reacting with heat treatment in the known way a polyhydric alcohol, polybasic acid and the acids derived by hydrolysis from fatty oil. Or the oil itself may be used as the source of the acid radicals if the oil and polyhydric alcohol are first heated in the presence of litharge or other basic catalyst and the reaction product thus obtained heated with the polybasic acid. Although the resins may be made from various polyhydric alcohols and polybasic acids I prefer for the present purpose to use glycerol and phthalic anhydride. Examples of other suitable resins in terms of their phthalic glyceride and oil content are:

| | Percent by weight |
|---|---|
| Phthalic glyceride | 25 |
| Adipic glyceride | 25 |
| Soya bean oil | 50 |
| Phthalic glyceride | 50 |
| Soya bean oil | 50 |
| Phthalic glyceride | 12½ |
| Adipic glyceride | 37½ |
| Soya bean oil | 50 |
| Phthalic glyceride | 37½ |
| Adipic glyceride | 12½ |
| Soya bean oil | 50 |
| Phthalic glyceride | 25 |
| Sebacic glyceride | 25 |
| Soya bean oil | 50 |
| Phthalic glyceride | 38 |
| Soya bean oil | 62 |
| Phthalic glyceride | 75 |
| Beta fat | 25 |

To prepare the varnish of the resins to be used in the enamels the resins are usually diluted with a suitable quantity, for example 5% by weight of a hydrocarbon solvent, as for instance low flash naphtha having a boiling range of between 125–170° C.

As further instances of enamels which may be applied to the rubber composition film are the following:

| | Parts by weight |
|---|---|
| Pigment | 20 |
| Oil modified polyhydric alcohol-polybasic acid resin varnish | 60 |
| Plasticizer | 17 |
| Low-flash naphtha (125–170° C.) | 3 |
| Pigment | 30 |
| Oil modified polyhydric alcohol-polybasic acid resin varnish | 60 |
| Plasticizer | 10 |
| Pigment | 10 |
| Oil modified polyhydric alcohol-polybasic acid resin varnish | 65 |
| Plasticizer | 20 |
| Low-flash naphtha | 5 |
| Pigment | 10 |
| Oil modified polyhydric alcohol-polybasic acid resin varnish | 85 |
| Low-flash naphtha | 5 |

As indicated above, plasticizers may be used in preparing the enamel if desired. Suitable plasticizers for this purpose are such as glycol butyl phthalate, methyl cellosolve phthalate and high molecular weight softeners of similar constitution. Polyhydric alcohol-polybasic acid resins modified with non-drying oil such as coconut and castor oil may also be used as plasticizers. Plasticizer, when and if used, may vary in quantity of from 5% to 50% of the weight of the resin.

The product of the present invention is particularly adapted for use as a top material for automobile bodies where such material is required in colors and where the properties of retention of color during service and good durability are desirable or necessary.

The material finds further use in hoods for baby carriages, strollers, etc. Further uses are in connection with artificial leather specialties, for example in the manufacture of pocketbooks, belts and various similar accessories.

The coating system used in the present invention consisting of the specific type of rubber undercoat previously described overlaid with a film of pigmented oil modified polyhydric alcohol-polybasic acid resin is peculiarly resistant to the deteriorating influences to which rubber coated fabrics are subject. These influences consist first of physical changes resulting from exposure to the weather such as thermal expansion, contraction, moisture absorption, etc., and secondly chemical changes brought about by a photo-chemical effect of ultraviolet light and actinic rays, as well as by certain chemicals present in the atmosphere.

The material prepared according to the present invention has as its principal advantage increased durability and longer retention of color than the colored materials of similar kind made according to the present state of the art. The rubber compounds usually used are quite susceptible to the deteriorating influences previously mentioned. Unlike the black finishes, usually asphaltic, the usual types of colored varnishes used in the past do not materially retard the deterioration of the rubber undercoat since they are of such a nature as to continue to polymerize on exposure and the films thus become progressively more brittle and crack more readily. The result is the poor aging of the combination of the colored varnish on the ordinary type of rubber composition compound film. In the present invention these defects are avoided or reduced to a minimum by the particular type of resin top coat in combination with the specific type of compounding of the rubber composition.

Comparative tests have shown that the colored material made according to the present state of the art shows complete failure by development of large cracks under actual service conditions in from one to four weeks, whereas the material made according to the present invention shows no tendency to similar failure after continuous service for a period of over six months. After six months' service of the material of the present invention, only slightly localized checking is evident which is in marked contrast with the general development of cracks in the prior art material after service of only one to four weeks.

As many apparently widely different embodiments of this invention may be made without departing from the spirit and scope thereof, it is to be understood that I do not limit myself to the specific embodiments thereof except as defined in the appended claims.

I claim:

1. A process for producing rubber coated sheet material having a colored enamel finish which comprises applying to a flexible fabric backing a film of a relatively stiff rubber compound possessing the properties of low thermal expansion, high resistance to moisture absorption, and low elasticity, applying a film of colored pigmented composition the vehicle of which consists essentially of fatty oil modified polyhydric alcohol-polybasic acid resin, and baking the resulting product, said rubber compound consisting essentially of rubber, a high melting point wax, pigment, reinforcing filler, and vulcanizing ingredients, said rubber compound containing the rubber in an amount of approximately 25% to 35% and the wax in amount of approximately 5% to 20%.

2. A composite coated fabric product, having a colored top coat, said product comprising a fabric having a vulcanized film of rubber compound, and a film of colored pigmented composition the vehicle of which consists essentially of polyhydric alcohol-polybasic acid resin carried by said film of rubber compound, said film of rubber compound consisting essentially of rubber, pigment, a high melting point wax, and reinforcing filler, and possessing the properties of low thermal expansion, high resistance to moisture absorption, and low elasticity, said rubber compound containing the rubber in an amount of approximately 25% to 35% and the wax in amount of approximately 5% to 20%.

3. The process set forth in claim 1 in which the rubber compound has the following approximate composition:

| | Parts by weight |
|---|---|
| Raw rubber | 31.00 |
| Montan wax | 10.20 |
| Carbon black | 6.80 |
| Clay | 44.20 |
| Stearic acid | .49 |
| Litharge | 6.80 |
| Sulfur | .51 |
| | 100.00 |

RUSSELL MORGAN.